(No Model.)

S. W. TAYLOR.
ANTIFRICTION AXLE FOR VEHICLES.

No. 588,032. Patented Aug. 10, 1897.

WITNESSES:
Charles B. Mann Jr.
Chapin A. Ferguson.

INVENTOR:
Samuel W. Taylor
By Chas. B. Mann
ATTORNEY.

THE NORRIS PETERS CO., PHOTO-LITHO., WASHINGTON, D. C.

UNITED STATES PATENT OFFICE.

SAMUELL W. TAYLOR, OF BALTIMORE, MARYLAND, ASSIGNOR OF ONE-HALF TO GEORGE TAYLOR, HENRY TAYLOR, JR., JAMES A. TAYLOR, AND JOHN T. McINTYRE, OF SAME PLACE.

ANTIFRICTION-AXLE FOR VEHICLES.

SPECIFICATION forming part of Letters Patent No. 588,032, dated August 10, 1897.

Application filed April 27, 1897. Serial No. 634,093. (No model.)

*To all whom it may concern:*

Be it known that I, SAMUELL W. TAYLOR, a citizen of the United States, residing at Baltimore, in the State of Maryland, have invented certain new and useful Improvements in Antifriction Axle-Boxes for Vehicles, of which the following is a specification.

This invention relates to improvements in axle arms and boxes for vehicles.

One object of the invention is to provide the permanent collar of an axle with antifriction-rollers which will be confined in place without liability of dropping out when the wheel is off.

Another object is to provide the nut which retains the wheel on the axle-arm with antifriction-rollers, and still another object is to provide improved means for locking the retaining-nut, so that it may be screwed up onto the axle-arm more and more as the ends of the box wear, and thereby obviate the use of washers and take up the play or lost motion that results after such wear.

The invention is illustrated in the accompanying drawings, in which—

Figure 1:
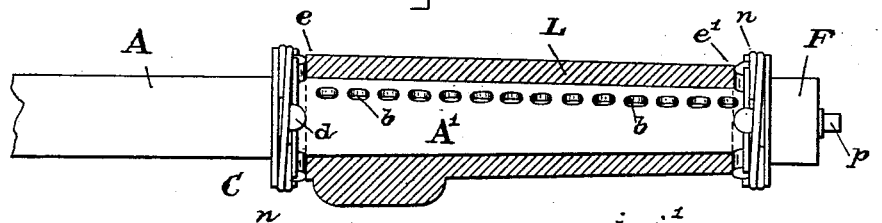
Figure 2:
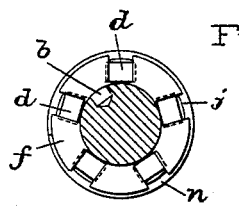
Figure 3:
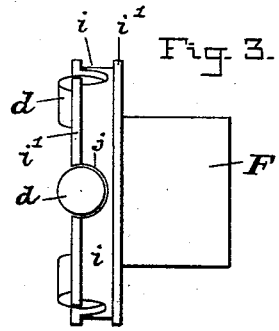
Figures 4, 5:
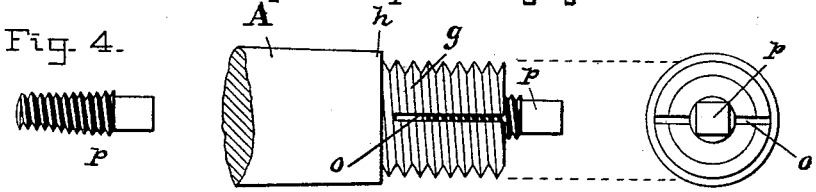
Figure 6:
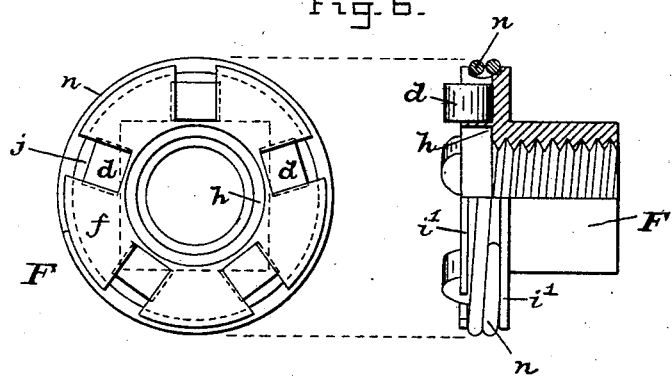

Figure 1 is a view of the end of an axle for vehicles and the improved collar and nut and showing the box in section. Fig. 2 is a cross-section of the axle-arm, looking toward the collar. Fig. 3 is a side view, on a larger scale, of the retaining-nut, the rollers thereon being in place but the confining-ring removed. Fig. 4 is a view of the tapered screw. Fig. 5 shows two views of the split screw end of the axle-arm. Fig. 6 shows two views of the retaining-nut.

The letter A designates a part of an axle for a vehicle, and A' the axle-arm. This arm is preferably provided with a series of small pits $b$ to hold lubricant and to receive particles of grit or dirt that may find entrance between the box and arm. The permanent collar C at the inner end of the arm is provided with antifriction-rollers $d$, against which the end $e$ of the box bears. No washer is employed. The rollers are confined in place on this permanent collar, so that when the wheel is removed from the axle-arm the rollers cannot drop out.

The construction of the collar to receive the rollers and the means employed to confine the rollers are exactly like the same features on the retaining-nut F, and as the details of this construction are more clearly illustrated in connection with said nut the description of the same will there be given.

The nut F screws on the end of the axle-arm, which is threaded, as usual, at $g$, but the nut has on its inner face $f$ a central recess or cavity $h$, which takes more or less over the extremity or smooth part of the axle-arm, as at $h'$ in Fig. 5. The circular rim of the nut has a circumferential channel or groove $i$ and a flange $i'$ at each side. This rim and the flange, which is flush with the inner face $f$ of the nut, has radial bores or sockets $j$, the ends of which open on the rim and one side of which opens on the said inner face of the nut. The side opening of these bored sockets in width is less than the diameter of the bore and thereby confines the rollers $d$ from dropping out at the side, but said side opening is wide enough to allow a portion of the roller to protrude and bear against the ends of the box L, as plainly shown in the drawings.

A suitable ring $n$ surrounds the circular rim and occupies the circumferential channel $i$ and crosses over the bores or sockets $j$ and thereby serves to confine the rollers $d$ from dropping out of the sockets at the ends. This ring in the present instance consists of a spring coil-wire which winds twice around the circular rim. The spring-wire coil may be readily detached to remove the rollers or to place a new one in position. It will now be seen that the rollers $d$ of the nut bear against the end $e'$ of the box L and that the nut by virtue of its central recess $h$ may be screwed onto the axle-arm to the desired extent and thereby reduce the end play of the box to the minimum.

The threaded end of the axle-arm has a straight slit $o$, and a central bore is tapped into said split end. A tapered screw $p$ enters the said end bore of the axle-arm and serves to spread or expand the split end. It will now be understood that when the nut F is on the screw end it may be set or "locked" by entering the tapered screw and expanding the split end in the nut.

Having thus described my invention, what I claim is—

1. The combination of an axle-box; an axle-arm having a screw-threaded end and where it adjoins the axle provided with a permanent collar; rollers mounted on said collar and serving as a bearing for one end of the said axle-box; a nut on the said screw-threaded end having on its inner side a central cavity which takes more or less over the extremity or smooth part of the axle-arm; and rollers on the inner face of said nut, said rollers serving as a bearing for the outer end of the axle-box, as set forth.

2. The combination of an axle-box; an axle-arm having a screw-threaded end and where it adjoins the axle provided with a permanent collar having radial bores or sockets the ends of which open on the circumferential rim and the sides of which open on the inner face; a roller occupying each bore or socket and of larger diameter than the side openings of said bores or sockets; a nut on the said screw-threaded end and provided with radial bores or sockets having openings; and rollers in the openings like those on the permanent collar, as set forth.

3. The combination of an axle-box, an axle-arm having a screw-threaded end and where it adjoins the axle provided with a permanent collar having radial bores or sockets the ends of which open on the circumferential rim and the sides of which open on the inner face and a channel around the circumferential rim; a roller occupying each bore or socket and of larger diameter than the side openings of said bores or sockets; a ring surrounding the collar and occupying the said channel and confining the rollers in the sockets; a nut on the said screw-threaded end and provided with radial bores or sockets having openings; and rollers in the openings and a surrounding ring like those on the permanent collar, as set forth.

4. The combination of an axle-box, an axle-arm having a screw-threaded end which is split and a central tap into the said split end; a nut fitted on the said screw-threaded end; and a tapered screw entered into the tap on said end and serving to expand the split end, as and for the purpose set forth.

In testimony whereof I affix my signature in the presence of two witnesses.

SAMUELL W. TAYLOR.

Witnesses:
CHARLES B. MANN, Jr.,
CHAPIN A. FERGUSON.